(12) United States Patent
Sugiyama et al.

(10) Patent No.: US 7,647,160 B2
(45) Date of Patent: Jan. 12, 2010

(54) FUEL INJECTION SYSTEM WITH INJECTION QUANTITY LEARNING FUNCTION

(75) Inventors: Kouichi Sugiyama, Chiryu (JP); Koji Ishizuka, Aichi-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/212,971

(22) Filed: Sep. 18, 2008

(65) Prior Publication Data

US 2009/0076707 A1    Mar. 19, 2009

(30) Foreign Application Priority Data

Sep. 19, 2007 (JP) .............................. 2007-242534

(51) Int. Cl.
  *B60T 7/12* (2006.01)
  *F02M 1/00* (2006.01)
(52) U.S. Cl. .................. 701/103; 701/110; 123/434; 123/675; 123/687
(58) Field of Classification Search ......... 701/101–105, 701/110–115; 123/434, 480, 486, 490, 492, 123/493, 675, 687
  See application file for complete search history.

(56) References Cited

U.S. PATENT DOCUMENTS

| | | | |
|---|---|---|---|
| 5,035,220 A * | 7/1991 | Uchinami et al. ........... 123/436 |
| 5,111,405 A * | 5/1992 | Maeda et al. ............... 701/110 |
| 5,540,209 A * | 7/1996 | Hasegawa et al. ........... 123/679 |
| 5,678,521 A * | 10/1997 | Thompson et al. .......... 123/447 |
| 6,907,861 B2 | 6/2005 | Asano |
| 6,920,388 B2 * | 7/2005 | Yasui ......................... 701/109 |
| 7,003,394 B2 * | 2/2006 | Takahashi et al. ........... 701/104 |
| 7,522,987 B2 * | 4/2009 | Fujii .......................... 701/104 |
| 2007/0157713 A1 | 7/2007 | Tsukamoto et al. |

FOREIGN PATENT DOCUMENTS

| JP | 2005-036788 | 6/2005 |
|---|---|---|
| JP | 2007-198368 | 8/2007 |

OTHER PUBLICATIONS

Japanese Office Action dated Jun. 23, 2009, issued in corresponding Japanese Application No. 2007-242534, with English translation.

* cited by examiner

*Primary Examiner*—John T Kwon
(74) *Attorney, Agent, or Firm*—Nixon & Vanderhye, PC

(57) ABSTRACT

A fuel injection system for an internal combustion engine which is designed to determine an instantaneous engine speed in a cycle of, for example, 30° CA of the engine to learn an actual injection quantity that is the quantity of fuel actually sprayed from a fuel injector. The system filters the instantaneous engine speed using a band-pass filter to extract a cyclic component which varies in synchronism with an engine operating cycle to produce an engine speed change which has arisen from the spraying of fuel into the engine from which unwanted noise components are removed and uses it to determine the actual injection quantity.

6 Claims, 11 Drawing Sheets

FRICTION-CAUSED SPEED CHANGE NEflt180 IS REGULATED IN LEVEL, SHIFTED 90° CA IN PHASE, AND SUBTRACTED FROM NEflt720

× GAIN

FUEL INJECTION SYSTEM WITH INJECTION QUANTITY LEARNING FUNCTION

CROSS REFERENCE TO RELATED DOCUMENT

The present application claims the benefit of Japanese Patent Application No. 2007-242534 filed on Sep. 19, 2007, the disclosure of which is incorporated herein by reference.

BACKGROUND OF THE INVENTION

1. Technical Field of the Invention

The present invention relates generally to a fuel injection system which may be engineered as a common rail fuel injection system for automotive internal combustion engines to perform a learning control task to learn a deviation of the quantity of fuel actually sprayed by a fuel injector from a target value to produce a correction value for correcting an injection duration for which the fuel injector is to be opened to spray the fuel desirably.

2. Background Art

There are known fuel injection systems for diesel engines which are designed to spray a small quantity of fuel into the engine (usually called a pilot injection) prior to a main injection of fuel in order to reduce combustion noise or NOx emissions. However, a deviation of the quantity of fuel actually sprayed from a fuel injector from a target quantity in the pilot injection will result in a decrease in beneficial effects of the pilot injection.

Japanese Patent First Publication No. 2005-36788 teaches a fuel injection system for diesel engines which is designed to perform an injection quantity learning task to instruct each of fuel injectors to spray a single jet of a small quantity of fuel into the diesel engine during a non-injection period such as deceleration of the engine for which no fuel is being sprayed into the engine and sample a change in speed of the engine resulting from the spraying of the jet of the fuel into the engine to learn the quantity of fuel actually sprayed from the fuel injector (which will also be referred to as an actual injection quantity below). The fuel injection system also works to calculate an injection quantity correction value required to correct an injection duration or on-duration for which each of the fuel injector is kept opened so as to minimize a deviation of the actual injection quantity from a target value.

The determination of the actual injection quantity is achieved by sampling the change in speed of the diesel engine proceeding from the spraying of the jet of fuel, multiplying such an engine speed change by the speed of the diesel engine to derive an output torque of the engine, as developed by the spraying of the jet of fuel, and calculating the actual injection quantity as a function of the output torque based on the fact that the output torque is usually proportional to the actual injection quantity. The fuel injection system analyzes the deviation of the actual injection quantity from the target value to compute the injection quantity correction value.

The sampling of the engine speed change is achieved in the above system by monitoring a sequence of rotation angle signals which are outputted from a speed sensor at an interval of usually 30° CA rotation of the engine to determine an instantaneous speed NE of the engine.

Specifically, the instantaneous engine speed NE is determined by measuring a time interval $T[\mu s]$ between the most recent input of the rotation angle signals and the input thereof immediately preceding it and converting the time interval T into the number of revolutions of the engine per minute (i.e., $NE=5000000/T[rpm]$). The engine speed change $\Delta NE$ arising from the spraying of the jet of fuel into the engine is defined by a deviation of the instantaneous engine speed $NE(i)$, as derived immediately after the spraying of fuel, from the instantaneous engine speed $NE(i-1)$, as derived one operation cycle of the engine earlier. In the case where the engine is of a four-cylinder four-stroke cycle type, the one operating cycle of the engine includes intake or induction, compression, combustion, and exhaust and corresponds to 720° CA through which the engine makes two complete revolutions.

The reason why the instantaneous engine speed $NE(i-1)$, as derived the one engine operation cycle earlier, is used to calculate the engine speed change $\Delta NE$ is to minimize adverse effects of a variation in the instantaneous engine speed NE between the cylinders of the engine on the calculation.

The instantaneous engine speed NE is, as described above, calculated each time the engine rotates a given angle (i.e., 30° CA), so that it has a value which will change with a change in speed of the engine and may also change due to disturbances or noises.

In order to ensure the stability in calculating the engine speed change $\Delta NE$ free from the noises, the condition in which a clutch connecting between the engine and a transmission is in a disengaged state may be one of conditions for initiating the above described injection quantity learning task. Specifically, when the clutch is engaged to connect the engine and the transmission during execution of the injection quantity learning task, it will cause physical vibrations to be transmitted from, for example, the road surface to an output shaft of the engine, which are, in turn, added to the rotation angle signal outputted from the speed sensor, thus resulting in decreased accuracy in calculating the engine speed change $\Delta NE$ to determine the actual injection quantity. The addition of such noises may, therefore, be avoided by initiating the injection quantity learning task when the clutch is disengaged.

In the case where the transmission is of a manual type, the disengagement of the clutch may be found directly by monitoring the action of an operator such as a vehicle driver. In the case where the transmission is of an automatic type, the condition in which the lock-up clutch, that is, the fluid coupling or the flex lockup clutch is disengaged may be used as one of the conditions for initiating the injection quantity learning task.

The addition of the condition in which the clutch is disengaged to one of the learning initiating conditions, however, results in a decrease in number of times the injection quantity learning tasks is executed during the running of the engine, thereby causing much time to be consumed in completing the injection quantity learning task for all the fuel injectors and resulting in decreased accuracy in controlling the quantity of fuel sprayed into the engine for such a period of time.

SUMMARY OF THE INVENTION

It is therefore a principal object of the invention to avoid the disadvantages of the prior art.

It is another object of the invention to provide a fuel injection system which works to execute an injection quantity learning task to find a deviation of the quantity of fuel actually sprayed from a fuel injector (i.e., the actual injection quantity) into an internal combustion engine from a target value to determine an injection quantity correction value required to bring the actual injection quantity into agreement with the target value and which is designed to derive a change in speed of the engine arising from the spraying of fuel thereinto for use in calculating the actual injection quantity to determine the injection quantity correction value without increasing conditions for initiating the injection quantity learning task.

According to one aspect of the invention, there is provided a fuel injection system for an internal combustion engine which may be employed with an automotive common rail fuel injection system and is designed to learn the quantity of fuel actually sprayed from a fuel injector to ensure the accuracy in spraying the fuel through the fuel injector. The fuel injection system comprises: (a) a fuel injector working to spray fuel into an internal combustion engine; and (b) an injection controller working to perform a speed calculating function to determine a length of time required by the engine to revolve a given angle each time the engine revolves the given angle and calculate an instantaneous speed of the engine based on the length of time. The injection controller also performs an injection instruction function, a first speed change calculating function, an actual injection quantity calculating function, a correction value calculating function, and a first filtering function. When the engine is decelerating, and no fuel is being sprayed into the engine, the injection controller entering an injection quantity learning mode to execute the injection instruction function to instruct the fuel injector to spray a target quantity of fuel into the engine. The first speed change calculating function is to calculate an engine speed change that is a change in speed of the engine arising from spraying of the fuel into the engine. The actual injection quantity calculating function is to determine an output torque of the engine based on the engine speed change, as derived by the first speed change calculating function; to calculate an actual injection quantity that is a quantity of the fuel expected to have been sprayed actually from the fuel injector based on the output torque. The correction value calculating function is to calculate an injection quantity correction value for correcting an injection duration for which the fuel injector is to be energized to spray the fuel so as to minimize a deviation of the actual injection quantity from the target quantity. The first filtering function is to filter the instantaneous speed of the engine to extract a cyclic component which varies in synchronization with an operating cycle of the engine. The first speed change calculating function works to calculate the engine speed change based on the cyclic component, as extracted from the instantaneous speed by the first filtering function.

Specifically, the first filtering function serves to produce the instantaneous speed of the engine from which noise components are removed. The first speed change calculating function uses such a noise component-removed speed of the engine to calculate the engine speed change for use in the actual injection quantity. This ensures the accuracy in determining the actual injection quantity and the injection quantity correction value without adding a determination of whether the clutch, as discussed in the introductory part of this application, is disengaged or not to a leaning condition for initiating the injection quantity learning mode. This also enables the number of chances to learn the actual injection quantity to be increased.

The first filtering function may be implemented by a band-pass filter designed to extract the cyclic component which varies in synchronization with the operating cycle of the engine. In the case where the engine is a four-stroke cycle engine, the frequency of the cyclic component is identical with two complete revolutions (i.e., 720° CA) of the engine. In the case where the engine is a two-stroke cycle engine, the frequency of the cyclic component is identical with one complete revolution (i.e., 360° CA) of the engine.

In the preferred mode of the invention, the speed calculating function calculates the instantaneous speed of the engine each time the engine revolves the given angle. The first filtering function filters each of the instantaneous speeds of the engine to extract the cyclic component. The first speed change calculating function uses a value of the cyclic component, as derived immediately after the fuel is sprayed by the fuel injector, and that, as derived the one operating cycle of the engine earlier, to determine the engine speed change.

The fuel injection system further includes fuel injectors so that each of the fuel injectors is installed in one of cylinders of the engine. The speed calculating function calculates the instantaneous speed of the engine each time the engine revolves the given angle. The first speed change calculating function filters each of the instantaneous speeds of the engine to extract the cyclic component. The first speed change calculating function determines an average value of values of the cyclic components, as derived when the cylinders in which the second fuel injectors are installed have reached a given timing, as expressed by a rotation angle of the engine, in other words, in unit of 180° CA rotation of the engine in the case where the engine is a four-cylinder four-stroke cycle engine and before the fuel is sprayed in the injection quantity learning mode, and uses a value of the cyclic component, as derived immediately after the fuel is sprayed, and the average value to determine the engine speed change.

The injection controller may be designed to perform a second filtering function to filter the instantaneous speed of the engine to extract a friction-caused cyclic component arising from mechanical friction of the engine. The first speed change calculating function removes the friction-caused cyclic component from the cyclic component, as derived by the first filtering function, to produce a friction component-removed cyclic component, and calculates the engine speed change based on the friction component-removed cyclic component.

The speed calculating function may be designed, as described above, to calculate the instantaneous speed of the engine each time the engine revolves the given angle. The first filtering function filters each of the instantaneous speeds of the engine to extract the cyclic component. The injection controller performs a second speed change calculating function to use values of the cyclic components, as derived before the fuel is sprayed from the fuel injector and before and after an injection timing at which the fuel is to be sprayed in the injection quantity learning mode is reached, to determine an engine speed change. The first speed change calculating function subtracts the engine speed change, as derived by the second speed change calculating function, from the engine speed change, as derived by the first speed change calculating function to determine an engine speed change used in calculating the actual injection quantity through the actual injection quantity calculating function.

The second speed change calculating function may alternatively be designed to use the values of the cyclic components, as derived before the fuel is sprayed from the fuel injector and before and after an injection timing at which the fuel is to be sprayed in the injection quantity learning mode is reached, to determine an engine speed change in a cycle, and determines an average value of the engine speed changes. The first speed change calculating function subtracts the average value from the engine speed change, as derived by the first speed change calculating function, to determine an engine speed change used in calculating the actual injection quantity through the actual injection quantity calculating function.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
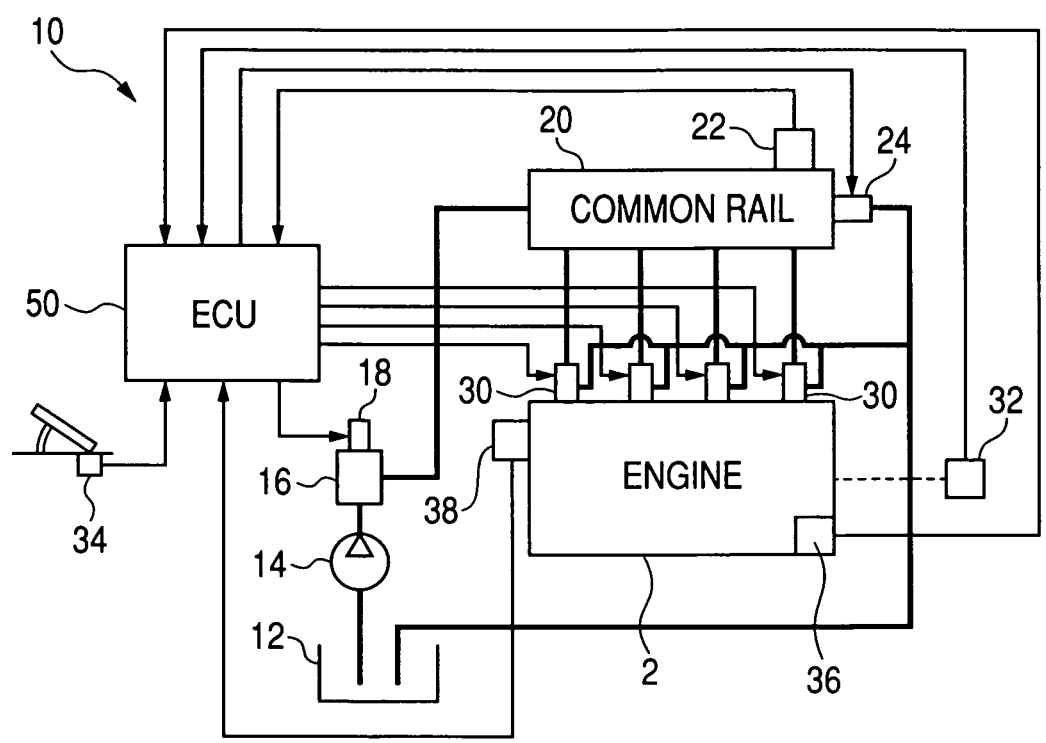
FIG. 1 is a block diagram which illustrates a fuel injection system according to the invention.

Referring to the drawings, particularly to FIG. 1, there is shown an accumulator fuel injection system 10 according to the invention.

The fuel injection system 10, as referred to herein, is designed to supply fuel to, for example, an automotive four-cylinder diesel engine 2 and essentially includes a common rail 20, fuel injectors 30, and an electronic control unit (ECU) 50. The common rail 20 works as an accumulator which stores therein fuel at a controlled high pressure. The fuel injectors 30 are installed one in each of cylinders of the diesel engine 2 and work to spray the fuel, as supplied from the common rail 20, into combustion chambers of the diesel engine 2. The ECU 50 works to control a whole operation of the fuel injection system 10.

The fuel injection system 10 also includes a feed pump 14 and a high-pressure pump 16. The feed pump 14 works to pump the fuel out of a fuel tank 12 and feed it to the high-pressure pump 16. The high-pressure pump 16 works to pressurize and deliver the fuel to the common rail 20.

The high-pressure pump 16 is of a typical structure in which a plunger is reciprocated following rotation of a cam of a camshaft of the diesel engine 2 to pressurize the fuel sucked into a pressure chamber thereof. The high-pressure pump 16 is equipped with a suction control valve 18 which controls the flow rate of fuel to be sucked from the feed pump 14 when the plunger is in a suction stroke.

The common rail 20 has installed therein a pressure sensor 22 which measures the pressure of fuel in the common rail 20 (which will also be referred to as a rail pressure below) and a pressure reducing valve 24 which drains the fuel from the common rail 20 to the fuel tank 12 to reduce the rail pressure.

The fuel injection system 10 also includes a speed sensor 32, an accelerator position sensor 34, a coolant temperature sensor 36, and an intake air temperature sensor 38. The speed sensor 32 works to output a pulse signal every 30° CA rotation of the crankshaft indicating the speed of the diesel engine 2. The accelerator position sensor 34 work to measure a driver's effort on or position ACC of an accelerator pedal (which corresponds to an open position of a throttle valve). The coolant temperature sensor 36 works to measure the temperature THW of coolant of the diesel engine 2. The intake air temperature sensor 38 works to measure the temperature TA of intake air charged into the diesel engine 2.

The ECU 50 is implemented by a typical microcomputer made up of a CPU, a ROM, and a RAM. The CPU works to implement a control program stored in the ROM to control the whole operation of the fuel injection system 10. The ECU 50 samples outputs from the pressure sensor 22, the sensors 32, 34, 36, and 38 and controls the pressure in the common rail 20, the quantity of fuel to be sprayed form the fuel injectors 30 and injection timings of the fuel injectors 30.

Specifically, the ECU 50 works (a) to calculate a target pressure in the common rail 20 (i.e., a target pressure of fuel to be sprayed from the fuel injectors 30 which will also be referred to as a target injection pressure below) based on the operating conditions of the diesel engine 2 in a known manner and control energization of the suction control valve 18 or the pressure reducing valve 24 to bring the pressure in the common rail 20, as measured by the pressure sensor 22, into agreement with the target pressure in a feedback control mode and (b) to calculate a target quantity of fuel to be sprayed from the fuel injectors 30 based on the operating conditions of the diesel engine 2 and to open each of the fuel injectors 30 at a given injection timing for an injection duration, as selected as a function of the target quantity to spray the fuel into one of the cylinders of the diesel engine 2 in a regular fuel injection control mode (which will also be referred to as fuel injection control below).

The ECU 50 is also designed to perform the pilot injection, as described above, prior to the main injection in the regular fuel injection control mode. The accuracy of the pilot injection in each of the fuel injectors 30 usually varies depending upon a deviation of a pulse width of a drive signal to be outputted from the ECU 50 to each of the fuel injectors 30 (i.e., an on-duration Td or an injection duration for which each of the fuel injectors 30 is kept opened, in other words, a target quantity of fuel to be sprayed from each of the fuel injectors 30) from the quantity of fuel actually sprayed from the fuel injector 30 (will also be referred to as an actual injection quantity or injection quantity Q below). In order to compensate for such an injection quantity deviation, the ECU 50 enters an injection quantity learning mode to learn the actual injection quantity to determine the target-to-actual injection quantity deviation and calculate a correction value (also referred to as an injection duration correction value below) required to correct the drive signal (i.e., the on-duration Td) to be outputted to a corresponding one of the fuel injectors 30 so as to bring the actual injection quantity Q into agreement with the target quantity (i.e., a pilot injection quantity). In the regular fuel injection mode, the ECU 50 uses the corrected drive signal to control the injection duration of a corresponding one of the fuel injectors 30 to bring the actual injection quantity Q into agreement with the target quantity in the pilot injection mode.

Figure 2:
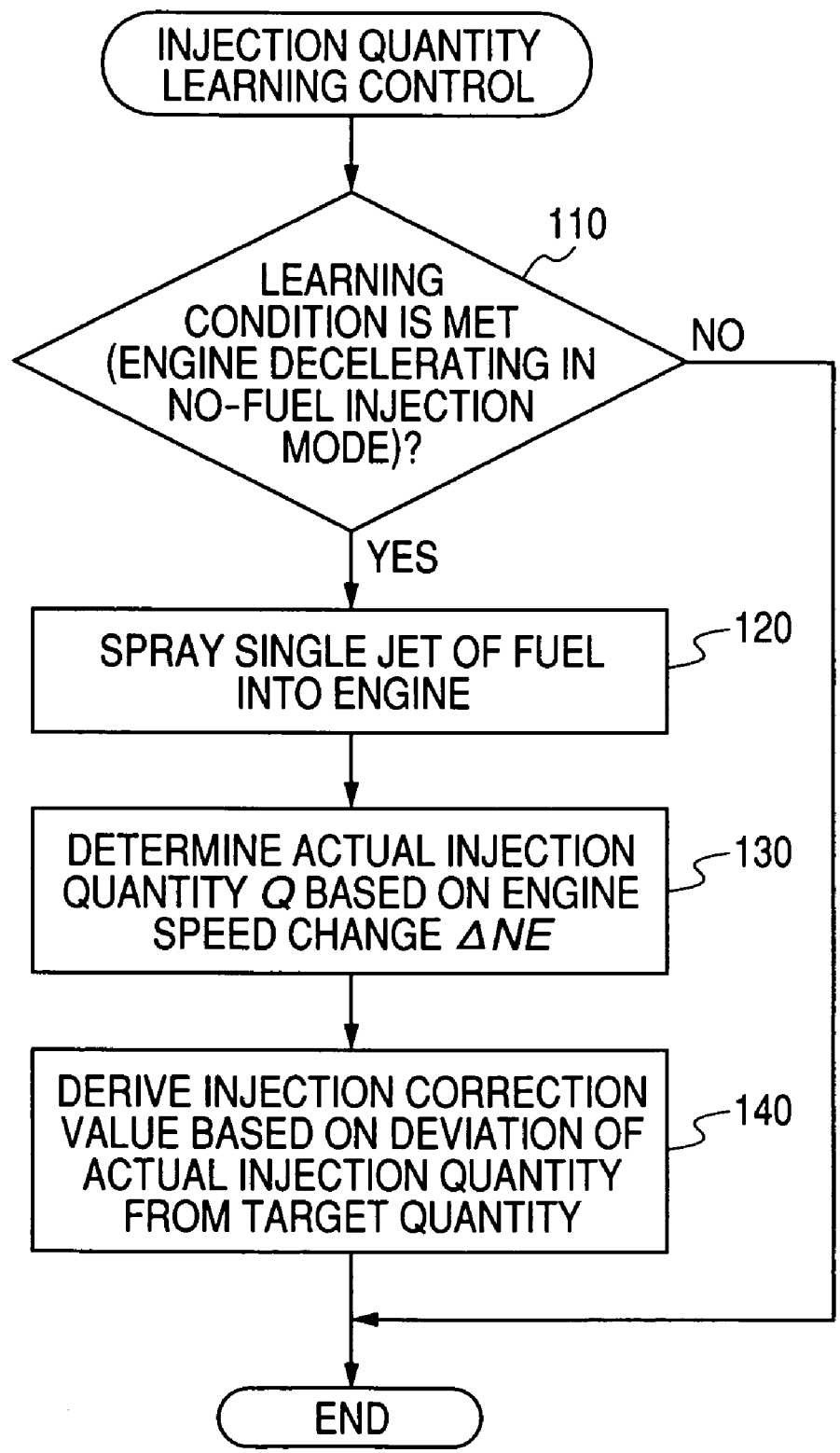
FIG. 2 is a flowchart of an injection quantity learning control program to be executed by an electronic control unit of the fuel injection system.
Figure 3:
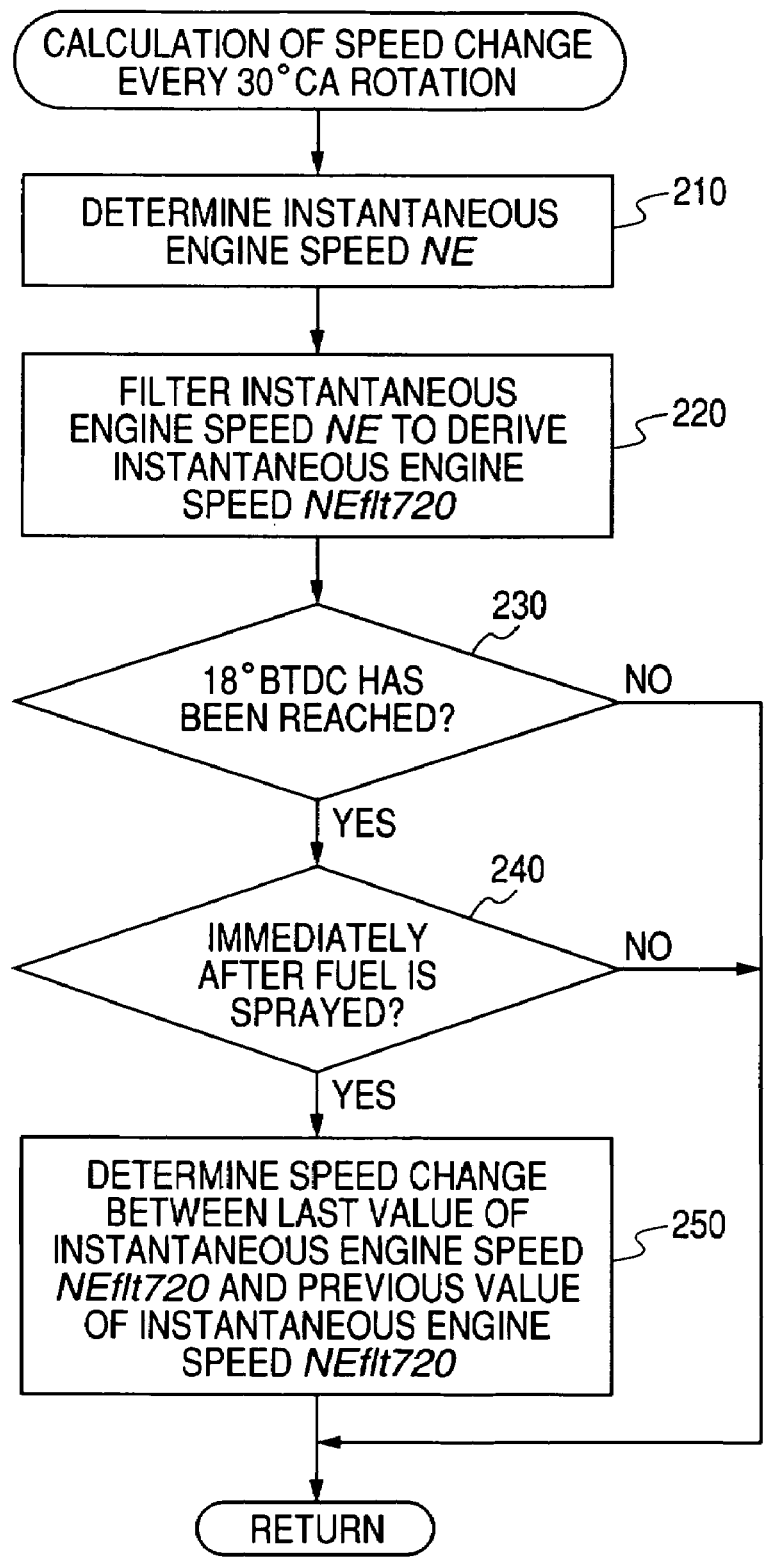
FIG. 3 is a flowchart of a speed change calculation program to be executed to determine a speed change of an internal combustion engine which has arisen from spraying of fuel and is used in the program of FIG. 2 to determine the quantity of fuel actually sprayed from a fuel injector.

FIGS. 2 and 3 show a flowchart of an injection quantity learning program to be executed by the ECU 50 in the injection quantity learning mode. This program is executed for each of the cylinders (i.e., each of the fuel injectors 30) of the diesel engine 2.

After entering the program, the routine proceeds to step 110 wherein it is determined whether a learning condition in which the position ACC of the accelerator pedal is zero (0), in other words, the accelerator pedal is released fully to decelerate the diesel engine 2, and no fuel is being sprayed into each of the cylinders of the diesel engine 2 is encountered or not.

If a NO answer is obtained meaning that the learning condition is not met, then the routine terminates. Alternatively, if a YES answer is obtained meaning that the learning condition is encountered to initiate a learning operation, as win be discussed below in detail, then the routine proceeds to step 120 wherein the ECU 50 selects one of the fuel injectors 30 to be learned in the actual injection quantity Q and determines an injection timing and an injection duration for the one of the fuel injectors 30. The ECU 30 outputs the drive signal to the one of the fuel injectors 30 to turn on or open it at the injection timing for the injection duration to spray a single shot of a target quantity of fuel into the diesel engine 2.

After the fuel is sprayed from the one of the fuel injectors 30, the routine proceeds to step 130 wherein an output from the speed sensor 32 is sampled to derive the speed NE of the diesel engine 2 and a change in speed NE arising from the spraying of the fuel thereinto (which will be referred to as a speed change ΔNE below) to calculate an output torque of the diesel engine 2. The ECU 50 also calculates the quantity of fuel expected to have been sprayed actually from the one of the fuel injectors 30 (i.e., the actual injection quantity Q) as a function of the output torque in a known manner.

The routine proceeds to step 140 wherein a deviation of the actual injection quantity Q, as derived in step 130, from the target quantity of fuel the fuel injector 30 has been instructed to spray in step 120 is determined to calculate an injection quantity correction value required to correct the pulse width of the drive signal to be outputted to the fuel injector 30 so as to bring the actual injection quantity Q into agreement with the target quantity. The ECU 50 updates a correction value calculation map.

FIG. 3 illustrates a speed change calculation program which is executed each input of the signal from the speed sensor 32, in other words, each 30° CA revolution of the diesel engine 2 to determine the speed change ΔNE in step 130.

The speed sensor 32 is designed to output an angular position signal in the form of a pulse each time the diesel engine 2 (i.e., the crankshaft) rotates 30° CA. Specifically, the speed sensor 32 outputs the angular position signal each time each of pistons of the diesel engine 2 reaches 78° BTDC, 48° BTDC, 18° BTDC, −12° BTDC, −42° BTDC, and −72° BTDC in sequence which are defined across the top dead center (TDC) at which the piston changes in motion from a compression stroke to a combustion stroke.

The program of FIG. 3 is, as described above, executed to derive the speed change ΔNE used in step 130 to determine the actual injection quantity Q. After entering the program, the routine proceeds to step 210 wherein the time interval T[μs] between a previous input of the angular position signal from the speed sensor 32 and a current input thereof is measured, in other words, the length of time required by the diesel engine 2 to rotate a given angle (i.e., 30° CA in this embodiment) last to calculate an instantaneous engine speed NE of the diesel engine 2 during such a time interval (NE=5000000/T[rpm]).

The routine proceeds to step 220 wherein the instantaneous engine speed NE is filtered according to an equation (1) below. Specifically, an engine speed NEflt720 is calculated using the instantaneous engine speed NE(i), as derived last, an instantaneous engine speed NE(i−1), as derived one operation cycle earlier (i.e., 30° CA ago), an instantaneous engine speed NE(i−2), as derived the two operation cycles earlier (i.e., 60° CA ago), a filtered engine speed NEflt720(i−1), as derived in step 220 the one operation cycle earlier, and a filtered engine speed NEflt720(i−2), as derived the two operation cycles earlier.

$$NEflt720 = KNM0 \times NE(i) + KNM1 \times NE(i-1) + KNM2 \times NE(i-2) - \quad (1)$$
$$KDN1 \times NEflt720(i-1) - KDN2 \times NEflt720(i-2)$$

where KNM0, KNM1, KNM2, KDN1, and KDN2 are constants (e.g., KNM0=0.025093042, KNM1=0.0, KNM2=−0.025093042, KDN1=−1.884120486, and KDN2=0.949813916).

Eq. (1) mathematically establishes a band-pass filter, as expressed by an equation (2) below, in an operation cycle of 30° CA revolution of the diesel engine 2. The band-pass filter in Eq. (2) is designed to have the center frequency so as to permit one of input signals whose cycle corresponds to two complete revolutions (i.e., 720° CA) of the diesel engine 2 to pass therethrough. Note that the diesel engine 2 is a four-cylinder four-stroke cycle engine in this embodiment, and, therefore, a one engine operating cycle includes intake or induction, compression, combustion, and exhaust and corresponds to 720° CA through which the diesel engine 2 makes two complete revolutions.

$$NEflt720 = NE \times 2\zeta\omega s/(s^2 + 2\zeta\omega s + \omega^2) \quad (2)$$

where "s" is the Laplacian operator, "ζ" is an attenuation factor, and, "ω" is the frequency of the one of the signals to be extracted. In this embodiment, "ζ" is 0.1. The operation cycle is 30° CA. "ω" is 720° CA (=π/12). Eq. (1) is a discrete equation into which Eq. (2) is transformed.

Specifically, in step 220, only a component of the instantaneous engine speed NE, as derived in step 210, which varies in a cycle of 720° CA is extracted as the instantaneous engine speed NEflt720.

After step 220, the routine proceeds to step 230 wherein it is determined whether the piston of one of the cylinders of the diesel engine 2 in which the one of the fuel injectors 30, as selected in this program cycle to be learned in the actual injection quantity Q, is installed has now reached 18° BTDC (i.e., 18° CA before the TDC) or not. 18° BTDC is an angular position of the piston suitable for calculating an instantaneous speed of the diesel engine 2 which has changed when the fuel sprayed in step 120 into one of the cylinders, as selected in this program cycle, has been burned.

If a NO answer is obtained in step 230 meaning that 18° BTDC is not reached, then the routine terminates. Alternatively, if a YES answer is obtained, then the routine proceeds to step 240 wherein it is determined whether the current time is immediately after the fuel is sprayed from the selected one of the fuel injectors 30 in step 120 or not. In other words, it is determined whether 18° BTDC has been reached first after the fuel is sprayed in the injection quantity learning mode or not.

If a NO answer is obtained in step 240 meaning that the current time is not immediately after the fuel is sprayed, then the routine terminates. Alternatively, if a YES answer is obtained, then the routine proceeds to step 250 wherein a difference between the value of the instantaneous engine speed NEflt720, as derived last in step 220, and that, as derived the twenty four (24) operation cycles earlier (i.e., two engine revolutions (720° CA) earlier), that is, a change between a value of the instantaneous engine speed NEflt720, as derived when the piston in one of the cylinders reaches a given angular position last and when the same piston reaches the given angular position one engine operating cycle (i.e., the last value of the instantaneous engine speed NEflt720–the previous value of the instantaneous engine speed NEflt720) is determined as the speed change ΔNE to be calculated in step 130.

As apparent from the above discussion, the ECU 50 is designed to filter each of the instantaneous engine speeds NE to extract a component therefrom which varies in a cycle of 720° CA as the instantaneous engine speed NEflt720.

Figure 4A:
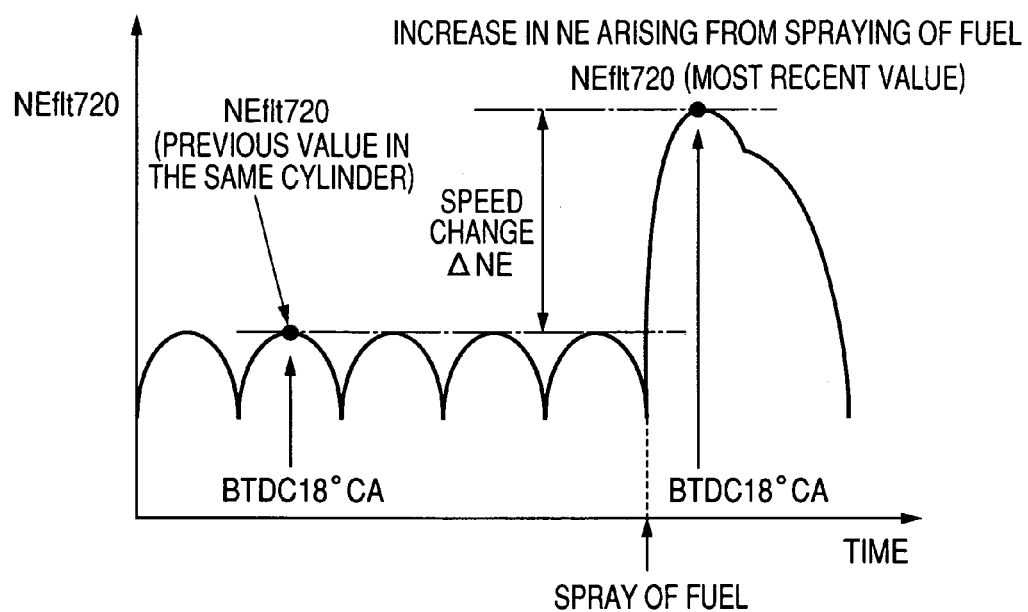
FIG. 4(a) is a view which demonstrates how to determine a speed change of an internal combustion engine which has arisen from spraying of fuel and is used in the program of FIG. 2 to determine the quantity of fuel actually sprayed from a fuel injector.

When the fuel has been sprayed from one of the fuel injectors 30 which is selected to be learned in the actual injection quantity Q, the ECU 50 works to sample, as illustrated in FIG. 4(a), a difference between the value of the instantaneous engine speed NEflt720, as calculated when the piston corresponding to the selected one of the fuel injectors 30 has reached 18° BTDC last, and that, as calculated when the same piston has reached 18° BTDC previously, that is, as calculated 720° CA earlier, is determined as the speed change ΔNE of the diesel engine 2 arising from the spraying of fuel thereinto.

Specifically, the ECU 50 works to extract only components from the instantaneous engine speeds NE which vary in a cycle of 720° CA and use them to calculate the speed change ΔNE of the diesel engine 2, as having appeared immediately after the fuel is sprayed from the selected one of the fuel injectors 30, thus ensuring the accuracy in determining the injection quantity correction value, as described above.

The above determination of the speed change ΔNE eliminates the need for adding a determination of whether the clutch, as discussed in the introductory part of this application, is disengaged or not to the learning condition, thus enabling the number of chances to execute the injection quantity learning operation to be increased.

Figure 4B:
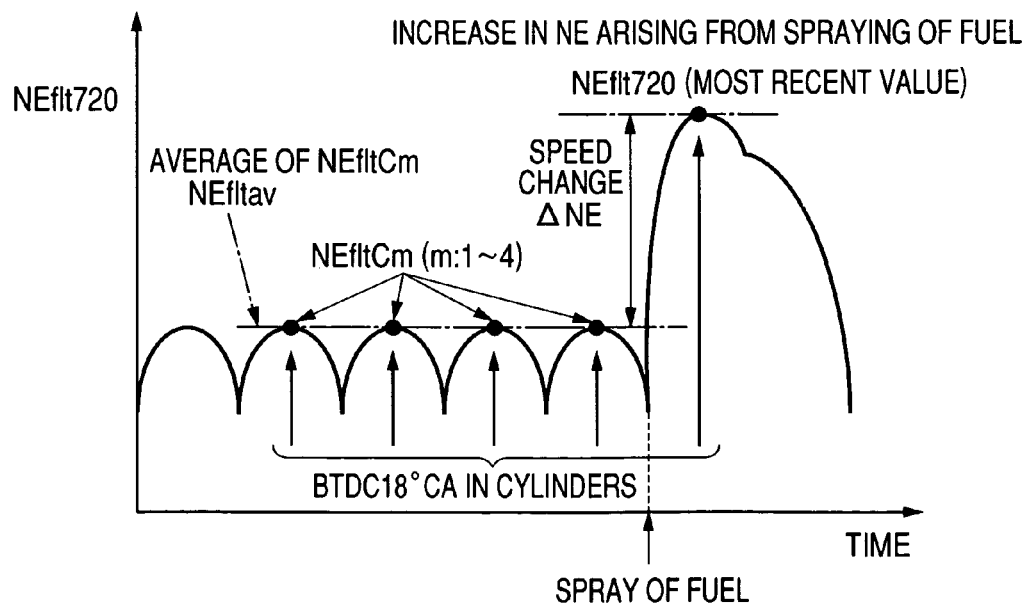
FIG. 4(b) is a view which is a modification of the first embodiment and shows how to determine a speed change of an internal combustion engine which has arisen from spraying of fuel and is used in the program of FIG. 2 to determine the quantity of fuel actually sprayed from a fuel injector.
Figure 5:
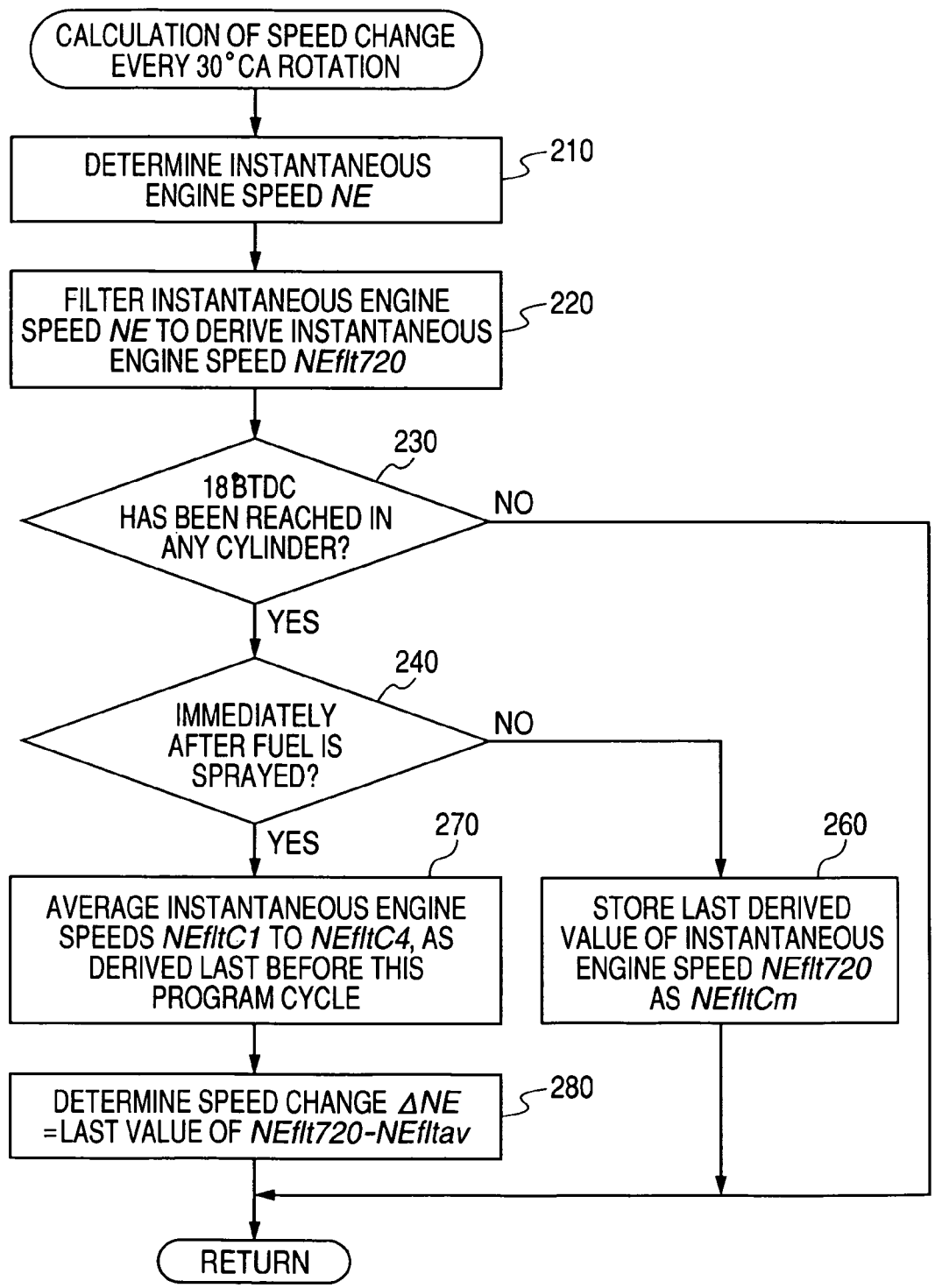
FIG. 5 is a flowchart of a modification of the speed change calculation program of the first embodiment which is illustrated in FIG. 4(b)

The ECU 50, as described above, works to determine a deviation of the value of the instantaneous engine speed NEflt720, as derived last with respect to one of the fuel injectors 30, from that, as derived 720° CA earlier with respect to the same fuel injector 30, as the speed change ΔNE of the diesel engine 2 arising from the spraying of fuel thereinto, but may alternatively be designed, as illustrated in FIG. 4(b), to calculate an average NEflav of the instantaneous engine speeds NEflt720, as derived at 18° BTDC in all cylinders #1 to #4 of the diesel engine before the fuel is sprayed (which will also be referred to below as NEfltCm where m is the cylinder number) and determine a deviation of the average NEflav from the value of the instantaneous engine speed NEflt720, as derived at 18° BTDC in one of the fuel injectors 30 selected to be learned in the actual injection quantity Q after the fuel is sprayed as the speed change ΔNE of the diesel engine 2.

The use of the average NEflav of the instantaneous engine speeds NEfltCm minimizes adverse effects of noises on the calculation of the speed change ΔNE of the diesel engine 2 to determine the actual injection quantity Q, thereby improving the accuracy in determining the injection quantity correction value.

FIG. 3 shows a modification of the flowchart of FIG. 3 to calculate the speed change ΔNE of the diesel engine 2 using the average NEflav, as described above.

After steps 210 and 220 which are identical in operation with the ones in FIG. 3, the routine proceeds to step 230 wherein it is determined whether the piston of any of the cylinders of the diesel engine 2 has now reached 18° BTDC or not, that is, the current time is when the piston of any of the cylinders has reached at 18° BTDC or not. If a NO answer is obtained, then the routine terminates. Alternatively, if a YES answer is obtained, then the routine proceeds to step 240 wherein it is determined, like in FIG. 3, whether the current time is immediately after the fuel is sprayed from the selected one of the fuel injectors 30 or not.

If a NO answer is obtained meaning that the current time is not just after the fuel is sprayed, then the routine proceeds to step 260 wherein the instantaneous engine speed NEflt720, as derived last in step 220, is stored in a memory as the instantaneous engine speed NEfltCm for the $m^{th}$ one of the cylinders in which the piston has now been reached 18° BTDC.

Alternatively, if a YES answer is obtained in step 240, then the routine proceeds to step 270 wherein the values of the instantaneous engine speeds NEfltC1 to NEfltC4, as calculated last before this program cycle, are read out of the memory, and the average NEfltav thereof is calculated.

The routine proceeds to step 280 wherein the average NEfltav is subtracted from the value of the instantaneous engine speed NEflt720, as derived in step 220 in this program cycle, and such a difference is defined as the speed change ΔNE of the diesel engine 2 to be used in step 130 of FIG. 2 to calculate the actual injection quantity Q.

The second embodiment of the invention will be described below.

Figure 6:
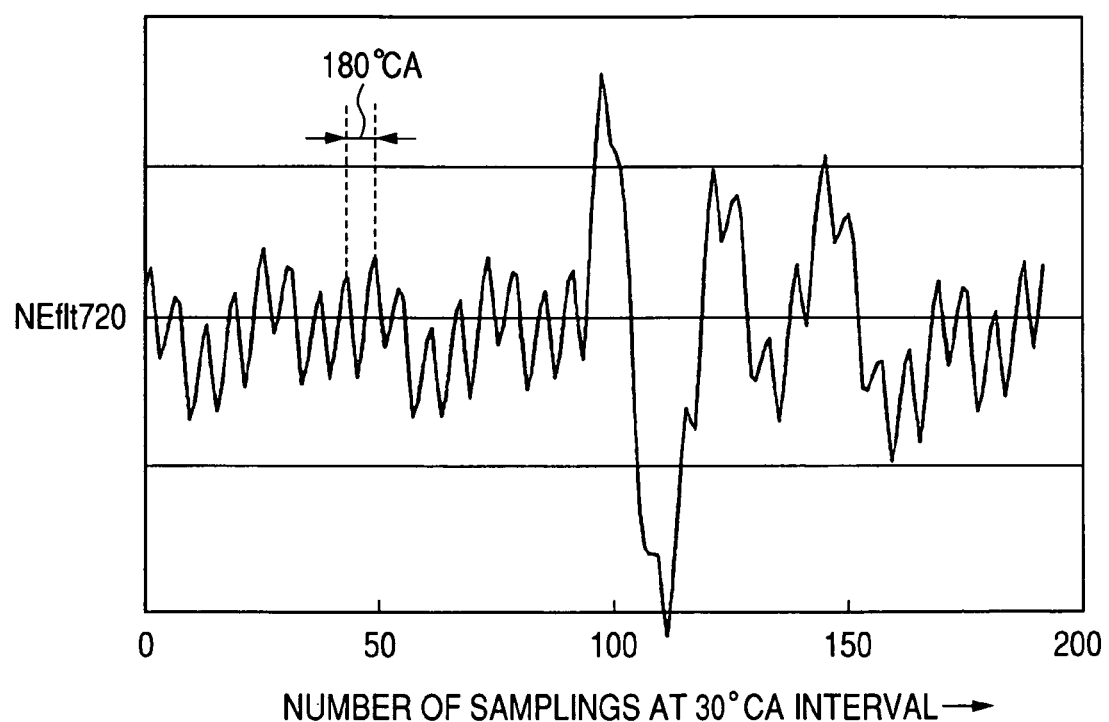
FIG. 6 is a view which shows a change of an instantaneous engine speed NEflt720 of a diesel engine which is filtered and contains a friction-caused component arising from the mechanical friction of the diesel engine.

The ECU 50 of the first embodiment is, as described above, designed to filter the instantaneous engine speed NE, as calculated in step 210, using the band-pass filter designed to allow a signal whose cycle is 720° CA of the diesel engine 2 to pass therethrough to remove unwanted components from the instantaneous engine speed NE to produce the instantaneous engine speed NEflt720 for use in calculating the speed change ΔNE of the diesel engine 2. The instantaneous engine speed NEflt720, however, may be subjected to the influence of mechanical friction of the diesel engine 2 so that it, as demonstrated in FIG. 6, changes in a cycle of 180° CA of the diesel engine 2. Note that the reason why the instantaneous engine speed NEflt720 changes in a cycle of 180° CA is because the diesel engine 2 has the four cylinders, and that the cycle of the change in the instantaneous engine speed NEflt720 depends upon the number of cylinders of the diesel engine 2.

In order to emphasize the accuracy in calculating the actual injection quantity Q (i.e., the injection quantity correction value), it is advisable to remove a component arising from the friction of the diesel engine 2 from the instantaneous engine speed NEflt720 or the speed change ΔNE.

The ECU 50 of the second embodiment is, therefore, designed to eliminate the engine friction-caused component of the filtered instantaneous engine speed NEflt720 in the following manner.

Figure 7:
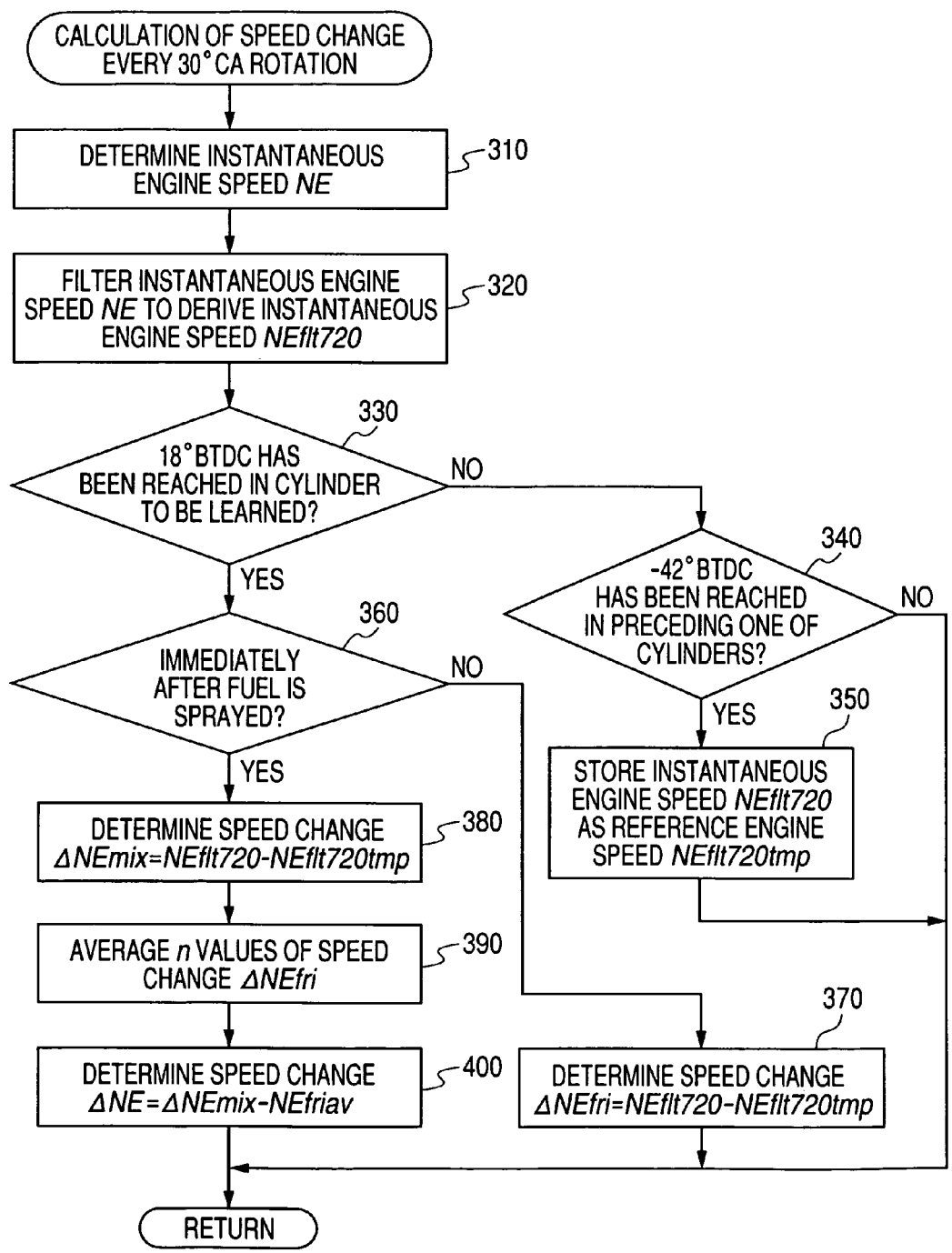
FIG. 7 is a flowchart of a speed change calculation program of the second embodiment to determine a speed change of an internal combustion engine which has arisen from spraying of fuel and from which the friction-caused component, as illustrated in FIG. 6, is removed.

Specifically, the ECU 50 performs a speed change calculation program, as illustrated in FIG. 7, instead of the one of FIG. 3.

After in steps 310 and 320, the instantaneous engine speed ΔNE and the filtered instantaneous engine speed NEflt720 are derived in the same manners as those in steps 210 and 220, the routine proceeds to step 330 wherein it is determined whether the current operation time is the moment 18° BTDC has been reached in one of the cylinders of the diesel engine 2 which is selected to be learned in the actual injection quantity Q or not.

If a NO answer is obtained, then the routine proceeds to step 340 wherein it is determined whether −42° CA has now been reached or not in one of the cylinders of the diesel engine 2 which precedes the one of the cylinders in the order of spraying the fuel which is selected in this program cycle to be learned in the actual injection quantity Q, in other words, whether the injection timing has now been reached in the one of the cylinders, as selected in this program cycle to be learned in the actual injection quantity Q, or not.

If a NO answer is obtained in step 340, then the routine terminates. Alternatively, if a YES answer is obtained meaning that −42° BTDC has been now reached in the preceding one of the cylinders, then the routine proceeds to step 350 wherein the value of the instantaneous engine speed NEflt720, as derived last in step 320, is stored in a memory (e.g., a RAM) as a reference engine speed NEflt720tmp for calculating a change in engine speed between before and after the injection timing for one of the cylinders of the diesel engine 2 which is selected in this program cycle to be learned in the actual injection quantity Q. The routine then terminates.

If a YES answer is obtained in step 330 meaning that the current time is the moment the current operation time is the moment 18° BTDC has been reached in the selected one of the cylinders of the diesel engine 2, then the routine proceeds to step 360 wherein it is determined whether the current time is immediately after the fuel is sprayed in one of the cylinders which is selected in this program cycle to be learned in the actual injection quantity Q or not.

If a NO answer is obtained in step 360, then the routine proceeds to step 370 wherein the reference engine speed NEflt720tmp stored in step 350 in the previous program cycle is read out of the memory and subtracted from the value of the instantaneous engine speed NEflt720, as derived in step 320 in this program cycle, to determine a speed change ΔNEfri that is a change in speed of the diesel engine 2 between before and after the injection timing is reached in the one of the cylinders as selected to be learned in the actual injection quantity Q before the fuel is sprayed into the diesel engine 2 and which is viewed as having arisen from the friction of the diesel engine 2. The routine then terminates.

Alternatively, if a YES answer is obtained in step 360 meaning that the current time is immediately after the fuel is sprayed, then the routine proceeds to step 380 wherein the reference engine speed NEflt720tmp stored previously in step 350 is read out of the memory and subtracted from the value of the instantaneous engine speed NEflt720, as derived in step 320 in this program cycle, to determine a speed change ΔNEmix (=NEflt720−NEflt720tmp) that is a change in speed of the diesel engine 2 between before and after the fuel is sprayed into the one of the cylinders selected to be learned in the actual injection quantity Q.

The routine proceeds to step 390 wherein the speed changes ΔNEfri which were derived and stored in step 370 through n previous program cycles are read out of the memory, and an average ΔNEfriav thereof is calculated.

The routine proceeds to step 400 wherein the average ΔNEfriav is subtracted from the speed change ΔNEmix, as derived in step 380, to determine the speed change ΔNE (=ΔNEmix−ΔNEfriav) which is to be used in determining the actual injection quantity Q in step 130 of FIG. 2.

Figure 8:
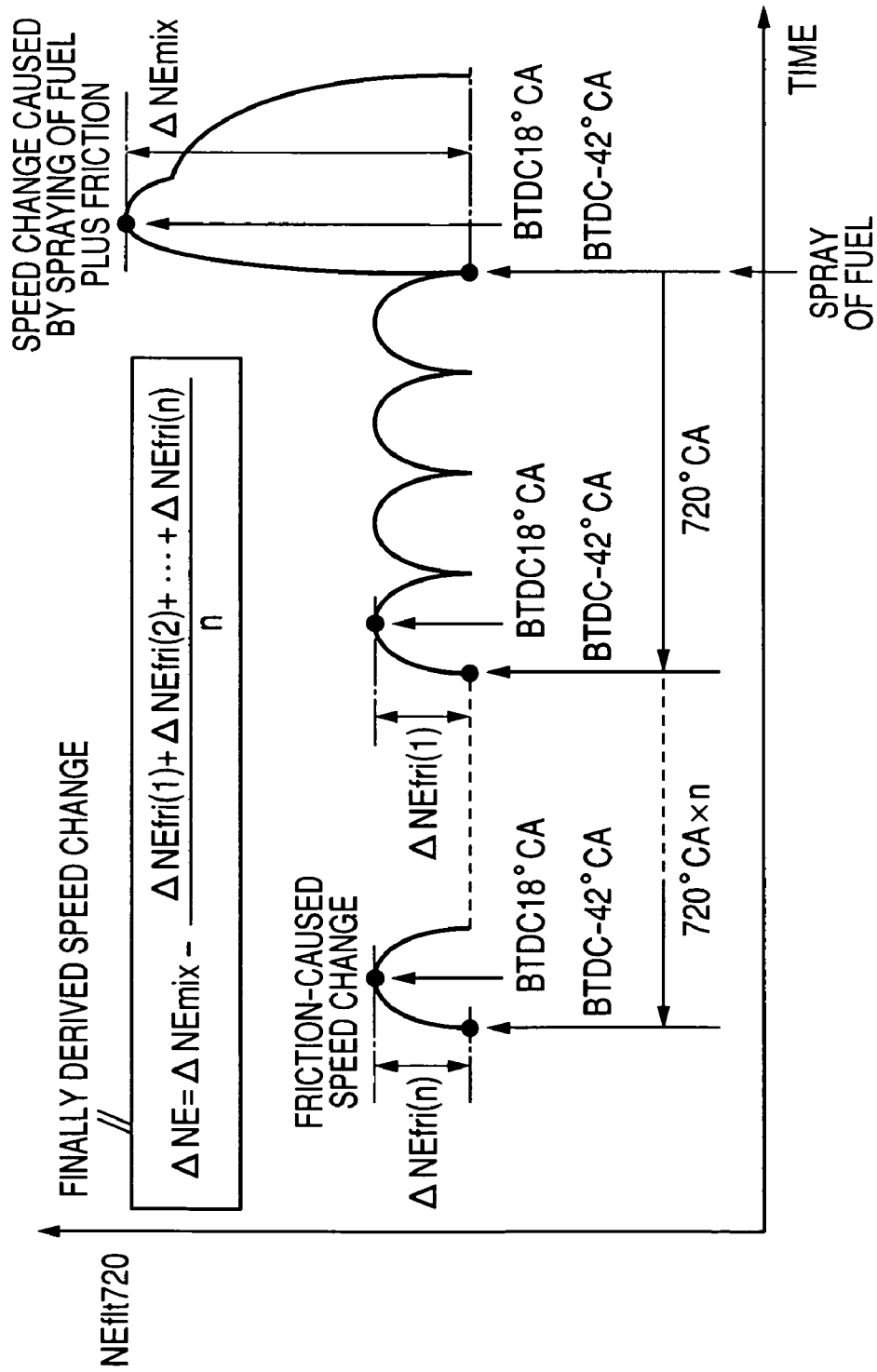
FIG. 8 is a view which illustrates a change in speed of the engine and explains how to determine the speed change of the engine in the program of FIG. 7

As demonstrated in FIG. 8, the speed change ΔNEmix which is calculated in step 380 usually includes a component caused by the mechanical friction of the diesel engine 2 as well as that proceeding from the spraying of the fuel.

In order to eliminate such a friction-caused component, the ECU 50 of this embodiment is designed to derive the speed change ΔNEfri (i.e., NEfri(1), NEfri(2) . . . , or NEfri(n)) in a cycle that is a change in speed of the diesel engine 2 before and after the injection timing is reached in one of the cylinders which is selected to be learned in the actual injection quantity Q before the fuel is sprayed into the one of the cylinders as a component of the change in speed of the diesel engine 2 which has arisen from the mechanical friction of the diesel engine 2 and determine the average ΔNEfriav of the speed changes NEfri(1), NEfri(2) . . . , and NEfri(n). The ECU 50 also subtracts the average ΔNEfriav from the speed change ΔNEmix to determine it as the friction component-removed speed change ΔNE for use in calculating the actual injection quantity Q in step 130 of FIG. 2. This results in increased accuracy in bringing the quantity of fuel actually sprayed from each of the fuel injectors 30 into agreement with a target value.

The third embodiment of the invention will be described below.

The ECU 50 of this embodiment is designed to filter the instantaneous engine speed NE to sample a component NEflt180 of change in speed of the diesel engine 2 arising from the mechanical friction thereof and subtract the component NEflt180 from the filtered instantaneous engine speed NEflt720 to produce an instantaneous engine speed NEflt for use in determining the speed change ΔNE.

Figure 9:
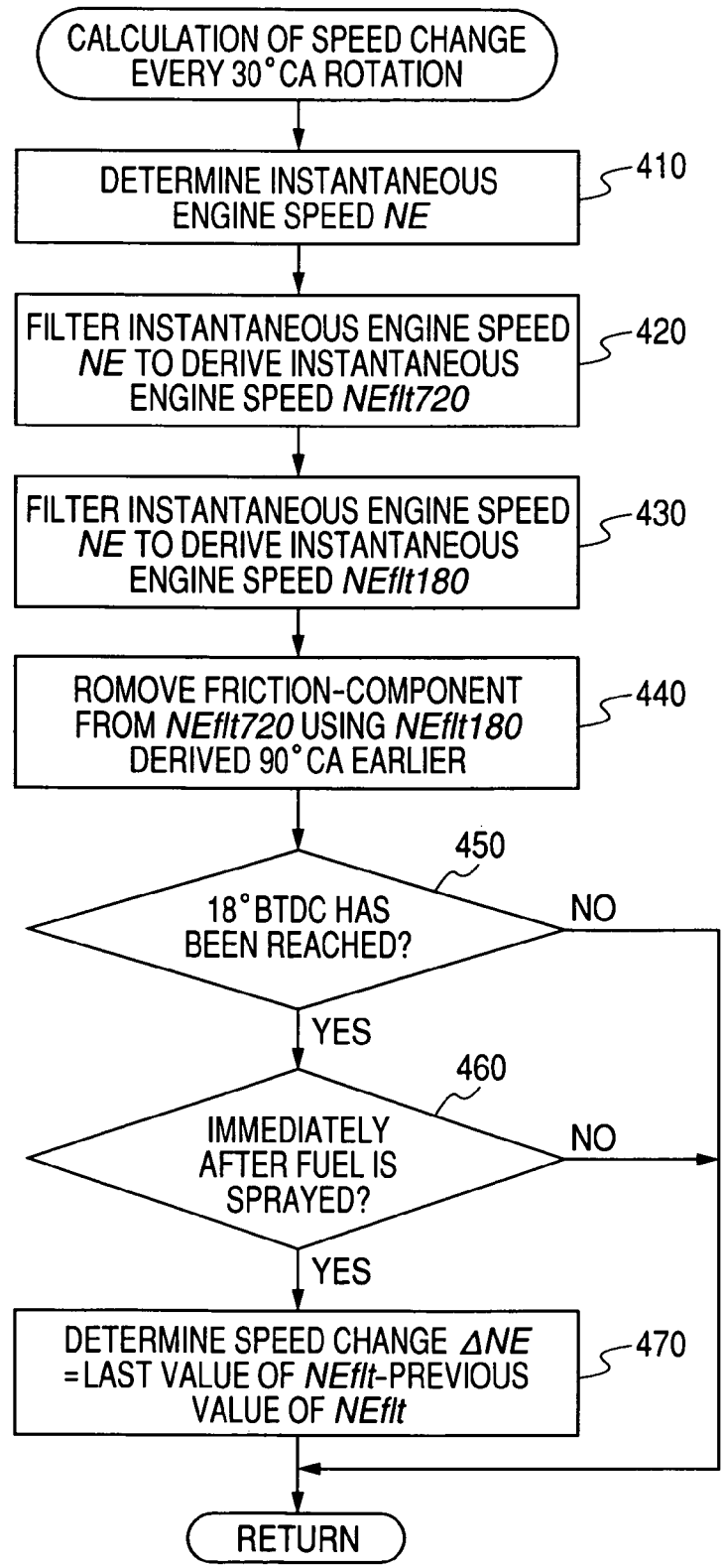
FIG. 9 is a flowchart of a speed change calculation program of the third embodiment to determine a speed change of an internal combustion engine which has arisen from spraying of fuel and from which a component caused by the friction of the engine is removed.

Specifically, the ECU 50 executes a speed change calculation program, as illustrated in FIG. 9, instead of the one of FIG. 3.

After in steps 410 and 420, the instantaneous engine speed ΔNE and the filtered instantaneous engine speed NEflt720 are derived in the same manners as those in steps 210 and 220, the routine proceeds to step 430 wherein the instantaneous engine speed NE is filtered according to an equation (3) below. Specifically, the engine speed NEflt180 is derived using the instantaneous engine speed NE(i), as derived last, the instantaneous engine speed NE(i−1), as derived the one operation cycle earlier (i.e., 30° CA earlier), the instantaneous engine speed NE(i−2), as derived the two operation cycles earlier (i.e., 60° CA earlier), a filtered engine speed NEflt180(i−1), as derived in step 430 the one operation cycle earlier, and a filtered engine speed NEflt180(i−2), as derived in step 430 the two operation cycles earlier.

$$NEflt180 = \quad (3)$$
$$KNM10 \times NE(i) + KNM11 \times NE(i-1) + KNM12 \times NE(i-2) -$$
$$KDN11 \times NEflt180(i-1) - KDN12 \times NEflt180(i-2)$$

where KNM10, KNM11, KNM12, KDN11, and KDN12 are constants (e.g., KNM10=0.075945769, KNM11=0.0, KNM12=−0.075945769, KDN11=−1.052806229, and KDN12=0.848108462).

Eq. (3) mathematically establishes a band-pass filter in an operation cycle of 30° CA revolution of the diesel engine 2. The band-pass filter in Eq. (3) is designed to have the center frequency so as to permit one of input signals whose cycle corresponds to a half of revolution (i.e., 180° CA) of the diesel engine 2 to pass therethrough.

Specifically, in step 430, a component of the instantaneous engine speed NE, as derived in step 410, which has arisen from the mechanical friction of the diesel engine 2, that is, which varies in a cycle of 180° CA is extracted as the instantaneous engine speed NEflt180. The ECU 50 stores the instantaneous engine speed NEflt180 in a memory (e.g., RAM).

The routine proceeds to step 440 wherein the value of the instantaneous engine speed NEflt180, as derived 90° CA earlier in step 430 (which will also be referred to as an instantaneous engine speed NEflt180(i−3)) is read out of the memory and multiplied by a given gain, so that it is regulated in level. The instantaneous engine speed NEflt180(i−3) is then subtracted from the instantaneous engine speed NEflt720, as derived in step 420 in this program cycle, to produce an instantaneous engine speed NEflt (=NEflt720−NEflt180(i−3)) from which the friction-caused component is removed.

The routine proceeds to step 450 wherein it is determined whether the piston of one of the cylinders of the diesel engine 2 in which the one of the fuel injectors 30 which is selected in this program cycle to be learned in the actual injection quantity Q is installed has now reached 18° BTDC or not. If a NO answer is obtained in step 450 meaning that 18° BTDC is not reached, then the routine terminates. Alternatively, if a YES answer is obtained, then the routine proceeds to step 460 wherein it is determined whether the current time is immediately after the fuel is sprayed from the selected one of the fuel injectors 30 in step 120 or not.

If a NO answer is obtained in step 460 meaning that the current time is not immediately after the fuel is sprayed, then the routine terminates. Alternatively, if a YES answer is obtained, then the routine proceeds to step 470 wherein a difference between the value of the instantaneous engine speed NEflt, as derived last in step 440, and that, as derived the twenty four (24) operation cycles earlier (i.e., two revolutions (720° CA) earlier), that is, a change between a value of the instantaneous engine speed NEflt, as derived when the piston in one of the cylinders reaches a given angular position last and when the same piston reaches the given angular position one engine operating cycle earlier (i.e., the last value of the instantaneous engine speed NEflt−the previous value of the instantaneous engine speed NEflt) is determined as the speed change ΔNE to be calculated in step 130.

Figure 10A:
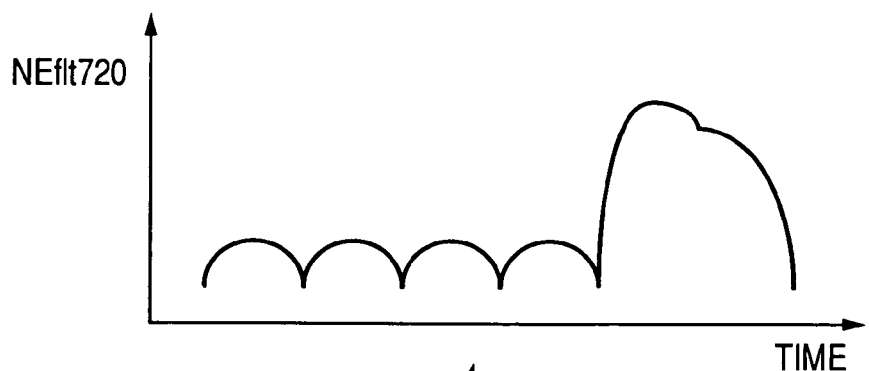
FIGS. 10(a), 10(b), and 10(c) are views which demonstrate how to determine the speed change of the engine in the program of FIG. 9.
Figure 10B:
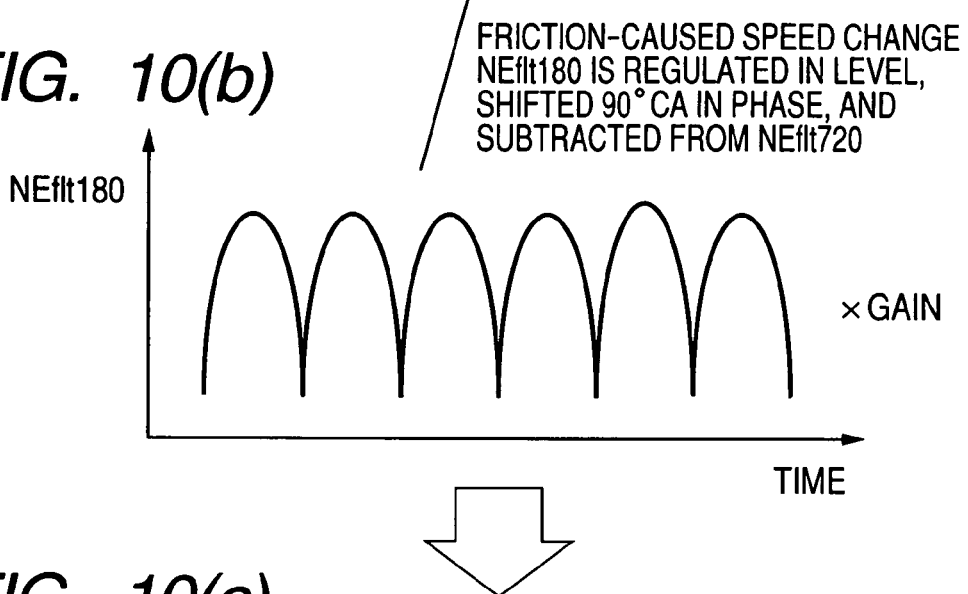
Figure 10C:
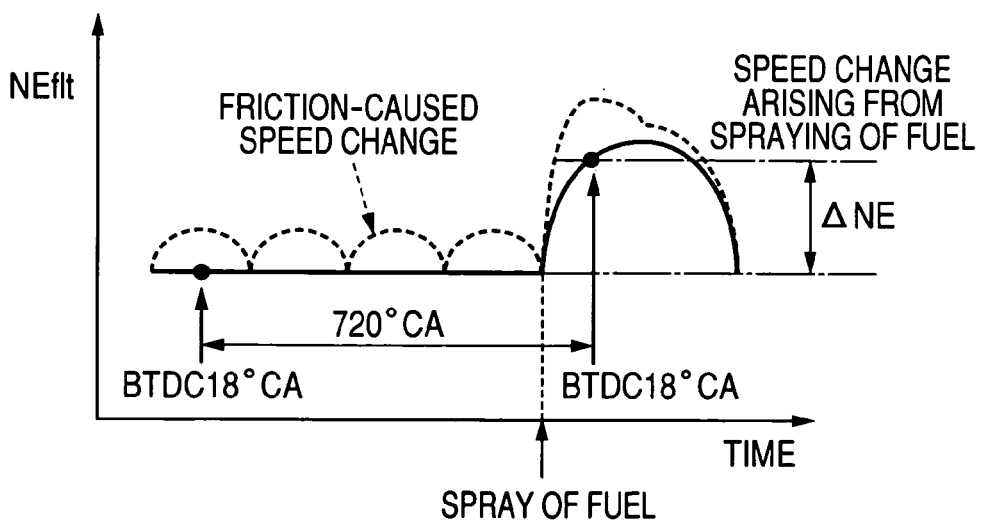

As apparent from the above discussion, the ECU 50 of this embodiment works to extract the component of change in speed of the diesel engine 2 arising from the spraying of the fuel in the injection quantity learning mode from the instantaneous engine speed NE through the filtering operation in step 420 and also extract the component arising from the mechanical friction of the diesel engine 2 from the instantaneous engine speed NE through the filtering operation in step 430, thereby producing, as illustrated in FIGS. 10(*a*) to 10(*c*), the two types of the instantaneous engine speeds NEflt720 and NEflt180.

Each time the instantaneous engine speed NEflt720 is calculated in step 420, the ECU 50 regulates or correct the level of the instantaneous engine speed NEflt180(i−3), as derived 90° CA earlier in step 430, and subtracts it from the instantaneous engine speed NEflt720 to provide the instantaneous engine speed NEflt from which the friction-caused component is removed. After the fuel is sprayed, the ECU 50 uses the values of the instantaneous engine speed NEflt one of which is derived last and the other of which is derived 720° CA earlier to determine the speed change ΔNE of the diesel engine 2 proceeding from the spraying of the fuel for use in calculating the actual injection quantity Q in step 130 of FIG. 2. This results in further increased accuracy in bringing the quantity of fuel actually sprayed from each of the fuel injectors 30 into agreement with a target value.

The instantaneous engine speed NEflt180(i−3) which has been derived 90° CA earlier in step 430 and regulated in level thereof is, as described above, used as a correction value for removing the friction-component from the instantaneous engine speed NEflt720. This is because the band-pass filter used in step 420 to filter the instantaneous engine speed NEflt720 has a characteristic, as demonstrated in FIG. 11.

Figure 11:
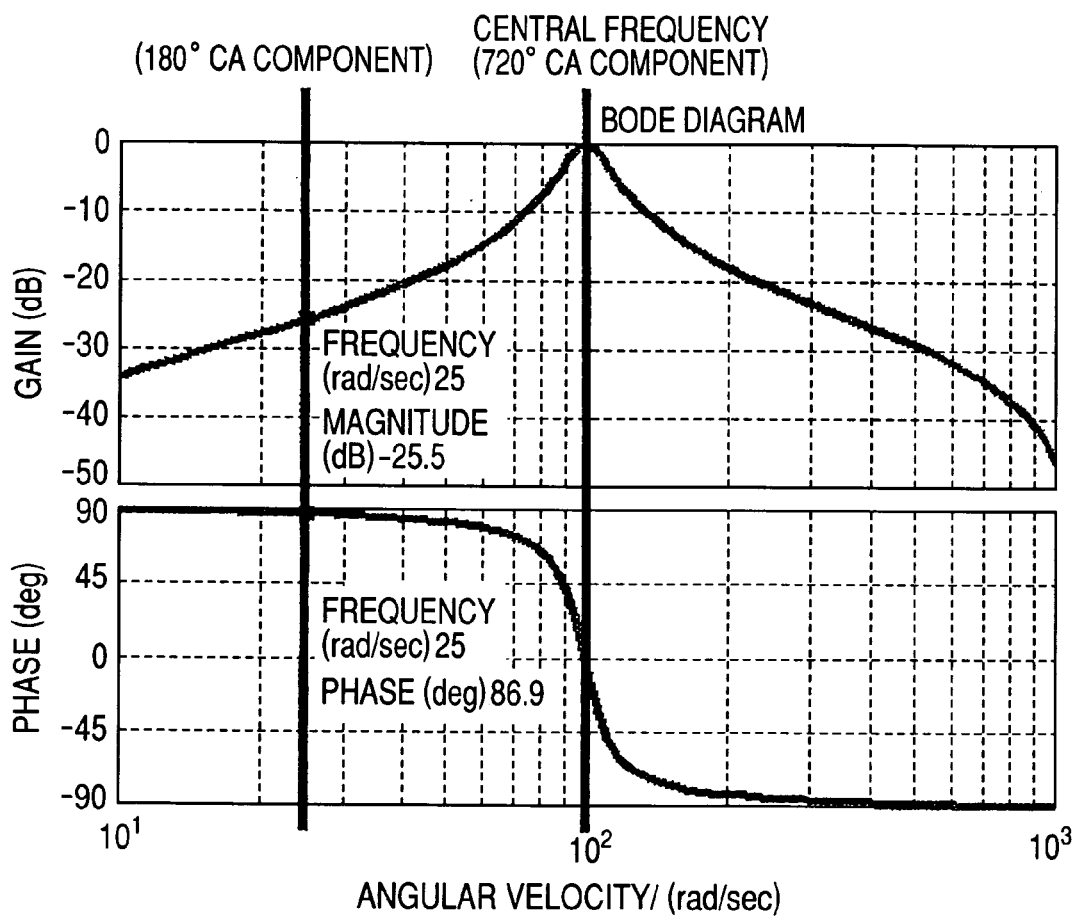
FIG. 11 is a bode diagram of a band-pass filter used in a filtering operation in the program of FIG. 9 to determine an instantaneous engine speed NEflt720.

FIG. 11 is a bode diagram of the band-pass filter used in the filtering operation in step 420. A change in center frequency will cause the component to be shifted only in the x-axis direction and result in no change in the characteristic of the band-pass filter. For the ease of understanding, the center frequency is set to 100 rad/sec.

In the band-pass filter used in step 420, the 180° CA cyclic component will be lower than in level by about 25.5 dB (≈0.053 times) and delayed in phase by 86.9 degrees behind the 720° CA cyclic component. Therefore, the ECU 50 dampens the instantaneous engine speed NEflt180(i−3), as derived 90° CA earlier, by 25.5 dB and subtracts it from the instantaneous engine speed NEflt720 in order to remove the friction-component from the instantaneous engine speed NEflt720 accurately.

It is apparent from the above that the phase of the instantaneous engine speed NEflt180 and the gain for use in regulating the level of the instantaneous engine speed NEflt180 are preferably selected depending upon the characteristic of the band-pass filter.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The second and third embodiments have referred to the component of change in speed of the diesel engine 2 which arises from the mechanical friction of the diesel engine 2 and varies in a cycle of 180° CA This is because the diesel engine 2 is a four-cylinder four-stroke engine. For instance, in the case where the diesel engine 2 is a six-cylinder four-stroke engine, the above friction-caused component will vary in a cycle of 120° CA.

Consequently, the time when the reference engine speed NEflt720tmp is to be stored in the memory, the times when the speed change ΔNEmix and the speed changes ΔNEfri are to be calculated, as referred to in the second embodiment, and the characteristic of the band-pass filter used in the third embodiment to remove the friction-caused component need to be selected depending upon the number of cylinders of the diesel engine.

The operation cycle of 30° CA used in the first to third embodiments may be changed even in the case where the diesel engine 2 is a four-cylinder engine and preferably set suitable for sampling a change in speed of the diesel engine 2 immediately after the fuel is sprayed thereinto.

The present invention may also be used with a fuel injection systems for gasoline engines as well as diesel engines.

What is claimed is:

1. A fuel injection system for an internal combustion engine comprising:

a fuel injector working to spray fuel into an internal combustion engine; and an injection controller working to perform a speed calculating function to determine a length of time required by the engine to revolve a given angle each time the engine revolves the given angle and calculate an instantaneous speed of the engine based on the length of time, said injection controller also performing an injection instruction function, a first speed change calculating function, an actual injection quantity calculating function, a correction value calculating function, and a first filtering function, when the engine is decelerating, and no fuel is being sprayed into the engine, said injection controller entering an injection quantity learning mode to execute the injection instruction function to instruct said fuel injector to spray a target quantity of fuel into the engine, the first speed change calculating function being to calculate an engine speed change that is a change in speed of the engine arising from spraying of the fuel into the engine, the actual injection quantity calculating function being to determine an output torque of the engine based on the engine speed change, as derived by the first speed change calculating function, to calculate an actual injection quantity that is a quantity of the fuel expected to have been sprayed actually from said fuel injector based on the output torque, the correction value calculating function being to calculate an injection quantity correction value for correcting an injection duration for which said fuel injector is to be energized to spray the fuel so as to minimize a deviation of the actual injection quantity from the target quantity, the first filtering function being to filter the instantaneous speed of the engine to extract a cyclic component which varies in synchronization with an operating cycle of the engine, wherein the first speed change calculating function calculates the engine speed change based on the cyclic component, as extracted from the instantaneous speed by the first filtering function.

2. A fuel injection system as set forth in claim 1, wherein the speed calculating function calculates the instantaneous speed of the engine each time the engine revolves the given angle, wherein the first filtering function filters each of the instantaneous speeds of the engine to extract the cyclic component, and wherein said first speed change calculating function uses a value of the cyclic component, as derived immediately after the fuel is sprayed by said fuel injector, and that, as derived the one operating cycle of the engine earlier, to determine the engine speed change.

3. A fuel injection system as set forth in claim 1, further comprising fuel injectors in addition to said fuel injectors, said fuel injectors being installed one in each of cylinders of the engine, wherein the speed calculating function calculates the instantaneous speed of the engine each time the engine revolves the given angle, the first speed change calculating function filtering each of the instantaneous speeds of the engine to extract the cyclic component, and wherein said first speed change calculating function determines an average value of values of the cyclic components, as derived when the cylinders in which the second fuel injectors are installed have reached a given timing, as expressed by a rotation angle of the engine, and before the fuel is sprayed in the injection quantity learning mode, and uses a value of the cyclic component, as derived immediately after the fuel is sprayed, and the average value to determine the engine speed change.

4. A fuel injection system as set forth in claim 1, wherein said injection controller also performs a second filtering function to filter the instantaneous speed of the engine to extract a friction-caused cyclic component arising from mechanical friction of the engine, and wherein the first speed change calculating function removes the friction-caused cyclic component from the cyclic component, as derived by the first filtering function, to produce a friction component-removed cyclic component, and calculates the engine speed change based on the friction component-removed cyclic component.

5. A fuel injection system as set forth in claim 1, wherein the speed calculating function calculates the instantaneous speed of the engine each time the engine revolves the given angle, wherein the first filtering function filters each of the instantaneous speeds of the engine to extract the cyclic component, wherein said injection controller performs a second speed change calculating function to use values of the cyclic components, as derived before the fuel is sprayed from said fuel injector and before and after an injection timing at which the fuel is to be sprayed in the injection quantity learning mode is reached, to determine an engine speed change, and wherein the first speed change calculating function subtracts the engine speed change, as derived by the second speed change calculating function, from the engine speed change, as derived by the first speed change calculating function, to determine an engine speed change used in calculating the actual injection quantity through the actual injection quantity calculating function.

6. A fuel injection system as set forth in claim 1, wherein the second speed change calculating function uses the values of the cyclic components, as derived before the fuel is sprayed from said fuel injector and before and after an injection timing at which the fuel is to be sprayed in the injection quantity learning mode is reached, to determine an engine speed change in a cycle, and determines an average value of the engine speed changes, and wherein the first speed change calculating function subtracts the average value from the engine speed change, as derived by the first speed change calculating function, to determine an engine speed change used in calculating the actual injection quantity through the actual injection quantity calculating function.

* * * * *